(12) United States Patent
Kachi

(10) Patent No.: US 7,729,324 B2
(45) Date of Patent: Jun. 1, 2010

(54) METHOD OF LIMITING COMMUNICATION ACCESS BETWEEN WIRELESS LAN TERMINALS

(75) Inventor: Seiji Kachi, Tokyo (JP)

(73) Assignee: NEC Corporation, Tokyo (JP)

( * ) Notice: Subject to any disclaimer, the term of this patent is extended or adjusted under 35 U.S.C. 154(b) by 1288 days.

(21) Appl. No.: 10/715,471

(22) Filed: Nov. 19, 2003

(65) Prior Publication Data

US 2004/0100934 A1 May 27, 2004

(30) Foreign Application Priority Data

Nov. 22, 2002 (JP) .............................. 2002-339388

(51) Int. Cl.
*H04Q 7/24* (2006.01)
(52) U.S. Cl. ..................... 370/338; 370/310.2; 370/245
(58) Field of Classification Search ............. 455/226.1, 455/435.1, 436, 439, 445, 452.1, 452.2; 370/338, 370/332
See application file for complete search history.

(56) References Cited

U.S. PATENT DOCUMENTS

| 7,095,722 B1 * | 8/2006 | Walke et al. ................. 370/315 |
| 2002/0151300 A1 * | 10/2002 | Suda et al. ................... 455/422 |
| 2003/0012179 A1 * | 1/2003 | Yano et al. ................... 370/352 |
| 2003/0214933 A1 * | 11/2003 | Margon ....................... 370/342 |
| 2004/0068668 A1 * | 4/2004 | Lor et al. ..................... 713/201 |
| 2004/0203593 A1 * | 10/2004 | Whelan et al. ............... 455/411 |

FOREIGN PATENT DOCUMENTS

| JP | 8-274804 | 10/1996 |
| JP | 10-164073 | 6/1998 |
| JP | 11-55286 | 2/1999 |
| JP | 2002-033768 | 1/2002 |
| JP | 2002-058052 | 2/2002 |
| JP | 2002-124952 | 4/2002 |
| JP | 2003-110567 | 4/2003 |
| JP | 2004-505573 | 2/2004 |

OTHER PUBLICATIONS

Japanese Office Action dated Sep. 19, 2007, with partial English translation.

* cited by examiner

*Primary Examiner*—Patrick N Edouard
*Assistant Examiner*—Dai A Phuong
(74) *Attorney, Agent, or Firm*—McGinn IP Law Group PLLC

(57) ABSTRACT

Different subnets are allocated to respective wireless LAN terminals. It is assumed that when the setting of IP addresses is completed, a packet is to be sent from wireless LAN terminal 1 to wireless LAN terminal 2. Since the different subnets are allocated to respective wireless LAN terminals 1, 2, wireless LAN terminals 1, 2 are unable to communicate directly with each other. Wireless LAN terminal 1 sends a packet destined for wireless LAN terminal 2 to a default gateway (=access limiter). Since the packet received by the access limiter is destined for wireless LAN terminal 2, the access limiter transfers the packet to wireless LAN terminal 2.

16 Claims, 7 Drawing Sheets

METHOD OF LIMITING COMMUNICATION ACCESS BETWEEN WIRELESS LAN TERMINALS

BACKGROUND OF THE INVENTION

1. Field of the Invention

The present invention relates to a method of limiting communication access between wireless LAN terminals.

2. Description of the Related Art

Some conventional inter-LAN repeaters for use in wireless LAN access point installations for regenerating signals between wired LANs and wireless LANs are capable of dispensing with unwanted repeating operation for unstudied stations in the wireless LANs thereby to greatly reduce the load on transmission paths in the wireless LANs which have a low transmission rate (see, for example, Patent Document 1 below).

There is known a wireless LAN system in which an access point as a control terminal device receives a frame destined outside a cell and makes a response representative of a reception success or a reception failure for efficient communications with a wireless terminal device in another cell or a wired terminal device connected to a wired transmission path (see, for example, Patent Document 2 below).

According to another known wireless LAN system, a control device stores connection permitting conditions for mobile stations (wireless LAN terminals) in respective access points, determines whether a connection request from a mobile station matches any of the stored connection permitting conditions, and allows the mobile station to be connected only if the connection request matches a stored connection permitting condition (see, for example, Patent Document 3 below).

FIG. 1 of the accompanying drawings shows a sequence of operation of a conventional wireless LAN that is made up of only existing devices. Address information allocated to terminals in the conventional wireless LAN shown in FIG. 1 is as follows:

Wireless LAN terminal 1:
IP address=192.168.1.1
Subnet mask=255.255.255.0
Subnet=192.168.1
Default gateway=192.168.1.254 (=access limiter);
Wireless LAN terminal 2:
IP address=192.168.1.2
Subnet mask=255.255.255.0
Subnet=192.168.1
Default gateway=192.168.1.254 (=access limiter);
Wired terminal:
IP address=192.168.0.1
Subnet mask=255.255.255.0
Subnet=192.168.0
Default gateway=192.168.1.254 (access limiter).

In FIG. 1, the wireless LAN terminals have identical subnets. In reply to an ARP request that flows from wireless LAN terminal 1 (604) to wireless LAN terminal 2 (605) prior to packet transmission, wireless LAN terminal 2 (605) directly returns a response. Therefore, data are returned from a wireless LAN access point, and communications are made without through access limiter 602.

According to conventional communications between wireless LAN terminals, because (1) identical subnets are allocated to wireless LAN terminals, and (2) packets designed for the identical subnets are sent not through a default gateway, data flow from wireless LAN terminal 1 to the access point to wireless LAN terminal 2, and hence an access limiting function cannot be provided unless the access point is modified.

Patent Document 1: Japanese laid-open patent publication No. 8-274804;

Patent Document 2: Japanese laid-open patent publication No. 10-164073; and

Patent Document 3: Japanese laid-open patent publication No. 11-55286.

The above conventional systems suffer from a problem as to how communications between wireless LAN terminals are to be seized with respect to band limitation and charging for pay services such as hot spots or the like.

Pay services such as hot spots or the like, which should be provided inexpensively unlike cellular phone services, do not have a lot of money to spend for constructing a network of their own. It is considered customary for those services to employ wireless LAN access points that can be purchased ordinarily, e.g., access points that are commercially available for about 30,000 yen, rather than customized access points. If hot spot services are to begin at locations where such inexpensive access points have already been installed (they cannot easily be removed as they are generally incorporated in buildings), it is the normal practice to use the existing equipment. However, since an inexpensive access point is not expected to be used by hot spot services, data sent from a wireless LAN terminal to another wireless LAN terminal are returned from the access point.

When communications such as ftp communications are performed between wireless LAN terminals that are not designed for use with hot spot services, the entire wireless band is consumed, causing trouble to the hot spot services. Basically, hot spot services need to limit communications between wireless LAN terminals.

Attention is being paid to hot spot services using wireless LANs. If an existing wireless LAN access point is employed, then since the access point returns data, data communications started between wireless terminals tend to occupy 100% of the wireless band in an area which cannot be controlled by the service provider, resulting in the danger of a failure to provide the services.

Consequently, it is necessary to solve the problem as to what should be done to prevent packets transmitted between wireless LAN terminals from being returned from an access point.

SUMMARY OF THE INVENTION

It is an object of the present invention to provide a method of limiting communication access between wireless LAN terminals to achieve inhibition/permission of communications and priority control over communications without modifying existing commercially available wireless LAN access points that are not designed for sophisticated settings such as for priority control or the like.

According to the present invention, there is provided a method of limiting communication access between wireless LAN terminals of a wireless LAN, comprising the steps of allocating different subnetwork addresses to respective wireless LAN terminals, setting default gateways of the respective wireless LAN terminals as a single access limiter, and returning a communication packet between the wireless LAN terminals, which would otherwise be returned from a wireless LAN access point, from the access limiter which is set as the default gateways rather than a wireless LAN access point, for thereby providing an access limiting function to limit communication access between the wireless LAN terminals without modifying the existing wireless LAN access point.

The access limiter has two LAN interfaces connected respectively to a wired terminal and the wireless LAN access point, the wireless LAN terminals being connected to the wireless LAN access point, the access limiter having an access limiting function for passing or dropping a received packet to thereby inhibit or permit communications between the terminals, a band limiting function for buffering a received packet to process audio packets with priority over other packets, a routing function for distributing packets selectively to the wired terminal and the wireless LAN access point depending on the destination of the packets, a DHCP server for allocating IP addresses having different subnets for the respective terminals in response to DHCP requests from the wired LAN terminals, and an ARP server installed in an existing IP protocol stack.

When a first one of the wireless LAN terminals is turned on, the first wireless LAN terminal sends a DHCP request to the wireless LAN access point for automatically resolving its own IP address. The wireless LAN access point, which operates as a bridge between a wireless LAN and a wired LAN, transfers the received DHCP request to the access limiter. The access limiter, which has a DHCP server function, returns a DHCP response to the DHCP request to the wireless LAN access point. The wireless LAN access point, which has received the DHCP response, converts the DHCP response from wired data to wireless data, sends the DHCP response to the first wireless LAN terminal to allow the first wireless LAN terminal to make IP communications according to IP address information allocated from the DHCP server. When a second one of the wireless LAN terminals is turned on, the second wireless LAN terminal sends a DHCP request to the wireless LAN access point for automatically resolving its own IP address. The wireless LAN access point, which operates as the simple bridge between a wireless LAN and a wired LAN, transfers the received DHCP request to the access limiter. The access limiter, which has the DHCP server function, returns a DHCP response to the DHCP request to the wireless LAN access point. The wireless LAN access point, which has received the DHCP response, converts the DHCP response from wired data to wireless data, sends the DHCP response to the second wireless LAN terminal to allow the second wireless LAN terminal to make IP communications according to IP address information allocated from the DHCP server. The first wireless LAN terminal sends a packet destined for the second wireless LAN terminal to the access limiter. The access limiter transfers the received packet, which is destined for the second wireless LAN terminal, to the second wireless LAN terminal.

Alternatively, when the first wireless LAN terminal is turned on, the first wireless LAN terminal sends a DHCP request to the wireless LAN access point for automatically resolving its own IP address. Since the DHCP request is a broadcast packet, the wireless LAN access point transfers the DHCP request to the access limiter on a wired LAN, and broadcasts the DHCP request to the second wireless LAN terminal. The access limiter, which has received the DHCP request, sets its own IP address to a predetermined value, and sends IP address information as a response to the first wireless LAN terminal. The second wireless LAN terminal, which has received the DHCP request, drops the received packet as the DHCP server is not activated. When the second wireless LAN terminal is turned on, the second wireless LAN terminal sends a DHCP request to the wireless LAN access point for automatically resolving its own IP address. Since the DHCP request is a broadcast packet, the wireless LAN access point transfers the DHCP request to the access limiter on the wired LAN, and broadcasts the DHCP request to the first wireless LAN terminal. The access limiter, which has received the DHCP request, sets its own IP address to a predetermined value, and sends IP address information as a response to the second wireless LAN terminal. The first wireless LAN terminal, which has received the DHCP request, drops the received packet as the DHCP server is not activated. When a packet is to be sent from the first wireless LAN terminal to the second wireless LAN terminal, since a subnet of the first wireless LAN terminal is different from a subnet of the second wireless LAN terminal, before the first wireless LAN terminal sends the packet to the access limiter set as the default gateways, the first wireless LAN terminal sends an ARP request to resolve a MAC address of the default gateways. The wireless LAN access point, which has received the ARP request, transfers the ARP request to the access limiter on the wired LAN and the second wireless LAN terminal. The access limiter which has the same address returns a response to the ARP request, and the second wireless LAN terminal which has a different address drops the packet. Since the first wireless LAN terminal has had the MAC address resolved by the ARP request, the first wireless LAN terminal sends a packet destined for the second wireless LAN terminal to the access limiter. If the access limiter is to permit communications between the wireless LAN terminals, the access limiter returns the received packet and sends the received packet to the second wireless LAN terminal.

Further alternatively, when the first wireless LAN terminal is turned on, the first wireless LAN terminal sends a DHCP request to the wireless LAN access point for automatically resolving its own IP address. Since the DHCP request is a broadcast packet, the wireless LAN access point transfers the DHCP request to the access limiter on a wired LAN, and broadcasts the DHCP request to the second wireless LAN terminal. The access limiter, which has received the DHCP request, sets its own IP address to a predetermined value, and sends IP address information as a response to the first wireless LAN terminal. The second wireless LAN terminal, which has received the DHCP request, drops the received packet as the DHCP server is not activated. When the second wireless LAN terminal is turned on, the second wireless LAN terminal sends a DHCP request to the wireless LAN access point for automatically resolving its own IP address. Since the DHCP request is a broadcast packet, the wireless LAN access point transfers the DHCP request to the access limiter on the wired LAN, and broadcasts the DHCP request to the first wireless LAN terminal. The access limiter, which has received the DHCP request, sets its own IP address to a predetermined value, and sends IP address information as a response to the second wireless LAN terminal. The first wireless LAN terminal, which has received the DHCP request, drops the received packet as the DHCP server is not activated. When a packet is to be sent from the first wireless LAN terminal to the second wireless LAN terminal, since a subnet of the first wireless LAN terminal is different from a subnet of the second wireless LAN terminal, before the first wireless LAN terminal sends the packet to the access limiter set as the default gateways, the first wireless LAN terminal sends an ARP request to resolve a MAC address of the default gateways. The wireless LAN access point, which has received the ARP request, transfers the ARP request to the access limiter on the wired LAN and the second wireless LAN terminal. The access limiter which has the same address returns a response to the ARP request, and the second wireless LAN terminal which has a different address drops the packet. Since the first wireless LAN terminal has had the MAC address resolved by the ARP request, the first wireless LAN terminal sends a packet destined for the second wireless LAN terminal to the access limiter. If the access limiter is to inhibit communications between the wireless LAN terminals, the access limiter drops the received packet.

Further alternatively, when the first wireless LAN terminal is turned on, the first wireless LAN terminal sends a DHCP request to the wireless LAN access point for automatically resolving its own IP address. Since the DHCP request is a broadcast packet, the wireless LAN access point transfers the DHCP request to the access limiter on a wired LAN, and broadcasts the DHCP request to the second wireless LAN terminal. The access limiter, which has received the DHCP request, sets its own IP address to a predetermined value, and sends IP address information as a response to the first wireless LAN terminal. The second wireless LAN terminal, which has received the DHCP request, drops the received packet as the DHCP server is not activated. When the second wireless LAN terminal is turned on, the second wireless LAN terminal sends a DHCP request to the wireless LAN access point for automatically resolving its own IP address. Since the DHCP request is a broadcast packet, the wireless LAN access point transfers the DHCP request to the access limiter on the wired LAN, and broadcasts the DHCP request to the first wireless LAN terminal. The access limiter, which has received the DHCP request, sets its own IP address to a predetermined value, and sends IP address information as a response to the second wireless LAN terminal. The first wireless LAN terminal, which has received the DHCP request, drops the received packet as the DHCP server is not activated. When a packet is to be sent from the first wireless LAN terminal to the second wireless LAN terminal, since a subnet of the first wireless LAN terminal is different from a subnet of the second wireless LAN terminal, before the first wireless LAN terminal sends the packet to the access limiter set as the default gateways, the first wireless LAN terminal sends an ARP request to resolve a MAC address of the default gateways. The wireless LAN access point, which has received the ARP request, transfers the ARP request to the access limiter on the wired LAN and the second wireless LAN terminal. The access limiter which has the same address returns a response to the ARP request, and the second wireless LAN terminal which has a different address drops the packet. Since the first wireless LAN terminal has had the MAC address resolved by the ARP request, the first wireless LAN terminal sends a packet destined for the second wireless LAN terminal to the access limiter. If the access limiter is to buffer communications between the wireless LAN terminals, the access limiter performs priority control of the received packet depending on the property thereof.

According to the present invention, in order to change a flow of packets from a wireless LAN via an access point to a wireless LAN to a flow of packets from a wireless LAN via an access point and a returning device to a wireless LAN, different subnets are allocated to respective wireless LAN terminals, and the returning device is set as a default gateway. With this arrangement, packets originating from a wireless LAN terminal and destined for another wireless LAN terminal can be fetched from the default gateway that is connected to a wired LAN. It is possible to control communications between wired LAN terminals by returning packets from the default gateway (=access limiter) and introducing a band limiting function and a blocking function.

Since a DHCP server:

(A) allocates different subnets to respective wireless LAN terminals, and (B) incorporates an access limiting function and a band limiting function, it is possible to achieve inhibition/permission of communications and priority control over communications for requests from wired LAN terminals without modifying existing commercially available wireless LAN access points that are not designed for sophisticated settings such as for priority control or the like.

With this arrangement, priority control over packets can be realized by an additional device to be added to many existing inexpensive wireless LAN access points that are in widespread use.

The method according to the present invention is expected to achieve priority control over audio packets in a network which handle a mixture of audio packets and data packets.

The above and other objects, features, and advantages of the present invention will become apparent from the following description with reference to the accompanying drawings which illustrate an example of the present invention.

DETAILED DESCRIPTION OF THE PREFERRED EMBODIMENT

Figure 1:
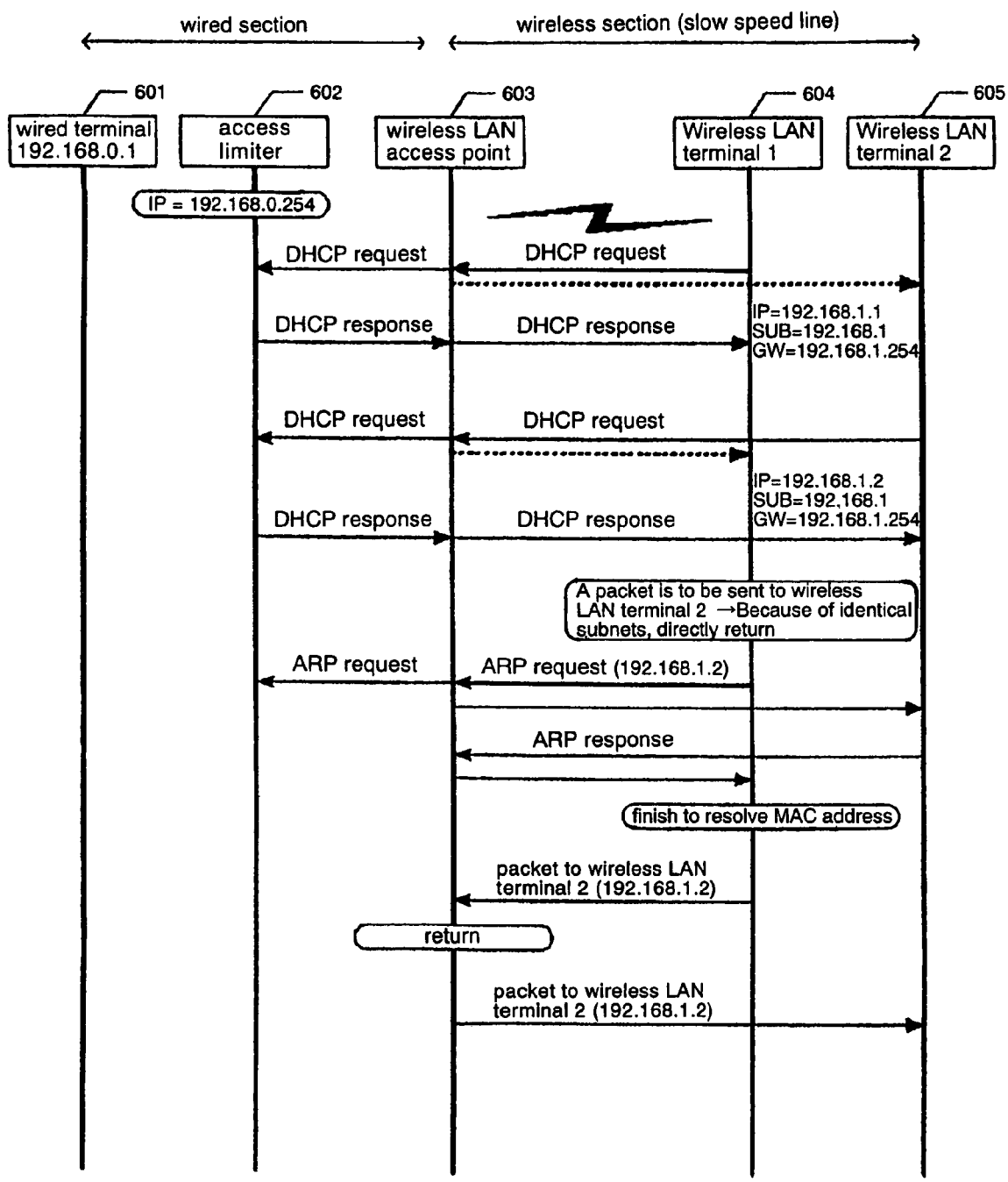
FIG. 1 is a diagram showing a sequence of operation of a conventional wireless LAN.
Figure 2:
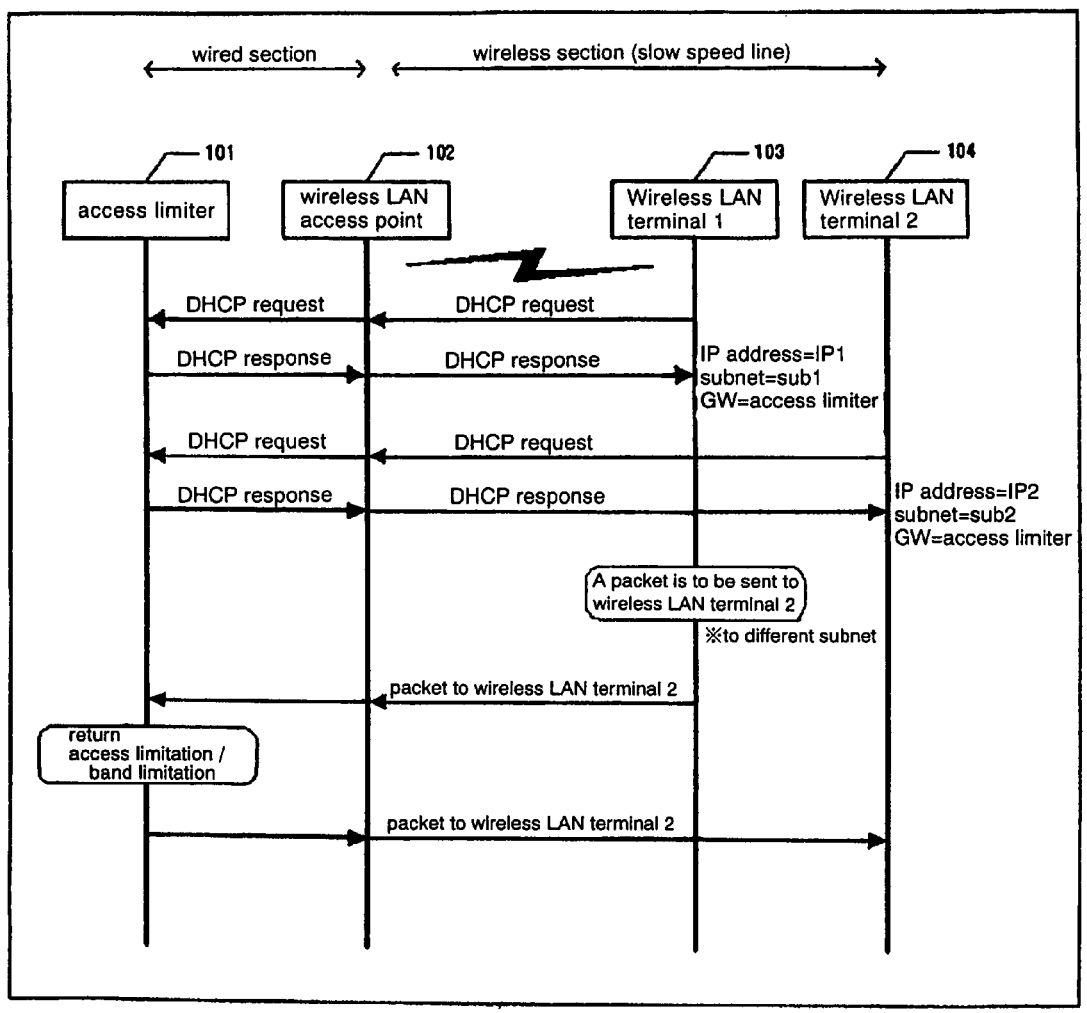
FIG. 2 is a diagram showing a sequence of operation of a wireless LAN according to the present invention.

FIG. 2 shows a sequence of operation of a wireless LAN according to the present invention.

As shown in FIG. 2, the wireless LAN has access limiter 101 which is a device for achieving features of the present invention. Access limiter 101 has a routing function for returning packets sent between wireless LAN terminals, an access limiting function, and a DHCP (Dynamic Host Configuration Protocol) server function which is an automatic address resolution function for IP addresses. Wireless LAN access point 102 operates to bridge between a wireless LAN and a wired LAN. Wireless LAN terminals 103, 104 communicate with wireless LAN access point 102.

When wireless LAN terminal 1 (103) is turned on, it sends a DHCP request for automatically resolving its own IP address to wireless LAN access point 102. Since wireless LAN access point 102 operates as a simple wired/wireless terminal bridge, it transfers the received DHCP request to access limiter 101. Access limiter 101 with the DHCP server function returns a DHCP response to the DHCP request to wireless LAN access point 102. IP address information allotted to wireless LAN terminal 1 (103) is as follows:

IP address=IP1 (e.g., 192.168.1.1)

Subnet mask=sub1 (e.g., 255.255.255.0)

Default gateway=access limiter 101 (e.g., 192.168.1.254).

Having received the DHCP response, wireless LAN access point 102 converts the DHCP response from wired data to wireless data, and sends the DHCP response to wireless LAN terminal 1 (103).

Wireless LAN terminal 1 (103) is now capable of performing IP communications according to the IP address information (IP address, subnet, and default gateway) allocated from the DCHP server.

Similarly, wireless LAN terminal 2 (104) acquires the following IP address information:

IP address=IP2 (e.g., 192.168.2.1)

Subnet mask=sub2 (e.g., 255.255.255.0)

Default gateway=access limiter 101 (e.g., 192.168.1.254).

Though access limiter 101 is a single device, it has a plurality of IP addresses (two addresses in this example).

According to the present invention, different subnets are allocated to respective wireless LAN terminals 1 (103), 2 (104).

It is assumed that when the setting of the above IP addresses is completed, a packet is to be sent from wireless LAN terminal 1 (103) to wireless LAN terminal 2 (104). Since different subnets are allocated to respective wireless LAN terminals 1 (103), 2 (104), wireless LAN terminals 1 (103), 2 (104) are unable to communicate directly with each other. Wireless LAN terminal 1 (103) sends a packet destined for wireless LAN terminal 2 (104) to the default gateway (=access limiter).

Since the packet received by access limiter 101 is destined for wireless LAN terminal 2 (104), access limiter 101 transfers the packet to wireless LAN terminal 2 (104). At this time, access limiter 101 performs its various functions to inhibit or permit the transfer of the packet or buffers the packet to give priority to other packets for thereby achieving access limitation.

According to the present invention, since (A) different subnets are allocated to respective wireless LAN terminals, and (B) the terminals have identical gateways, a packet sent between wireless LAN terminals which would otherwise be returned from a wireless LAN access point is returned from an access limiter that is designated as a default gateway, so that inhibition/permission of packet transfer and priority control over packet transfer can be achieved without modifying an existing network or an existing devices. (If the access point may be modified, then it is not necessary to apply the present invention to the access point. If the access point has a return limiting function and a priority control function, then it is possible to apply the present invention to the access point without any problem.)

Figure 3:
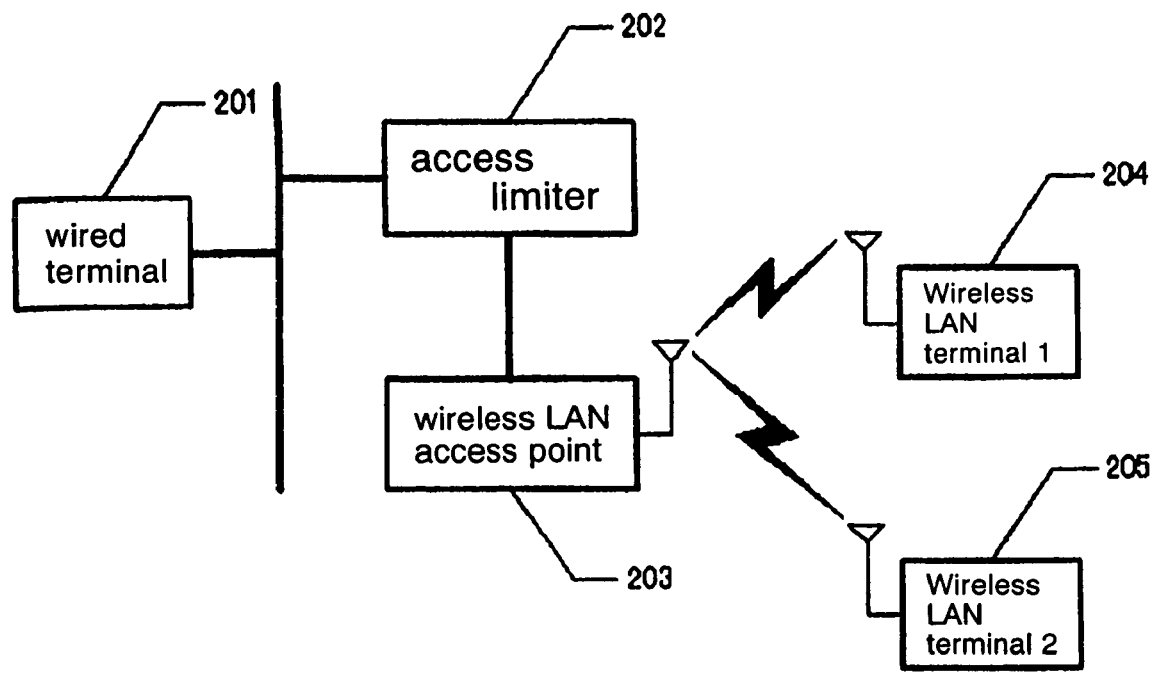
FIG. 3 is a block diagram of the wireless LAN according to the present invention.

FIG. 3 shows in block form the wireless LAN according to the present invention.

As shown in FIG. 3, wired terminal 201 which is connected to a wired LAN is connected to access limiter 202 according to the present invention. Wireless LAN access point 203 is connected to access limiter 202. Wireless LAN terminals 2.04, 205 are connected through wireless links to wireless LAN access point 203.

Figure 4:
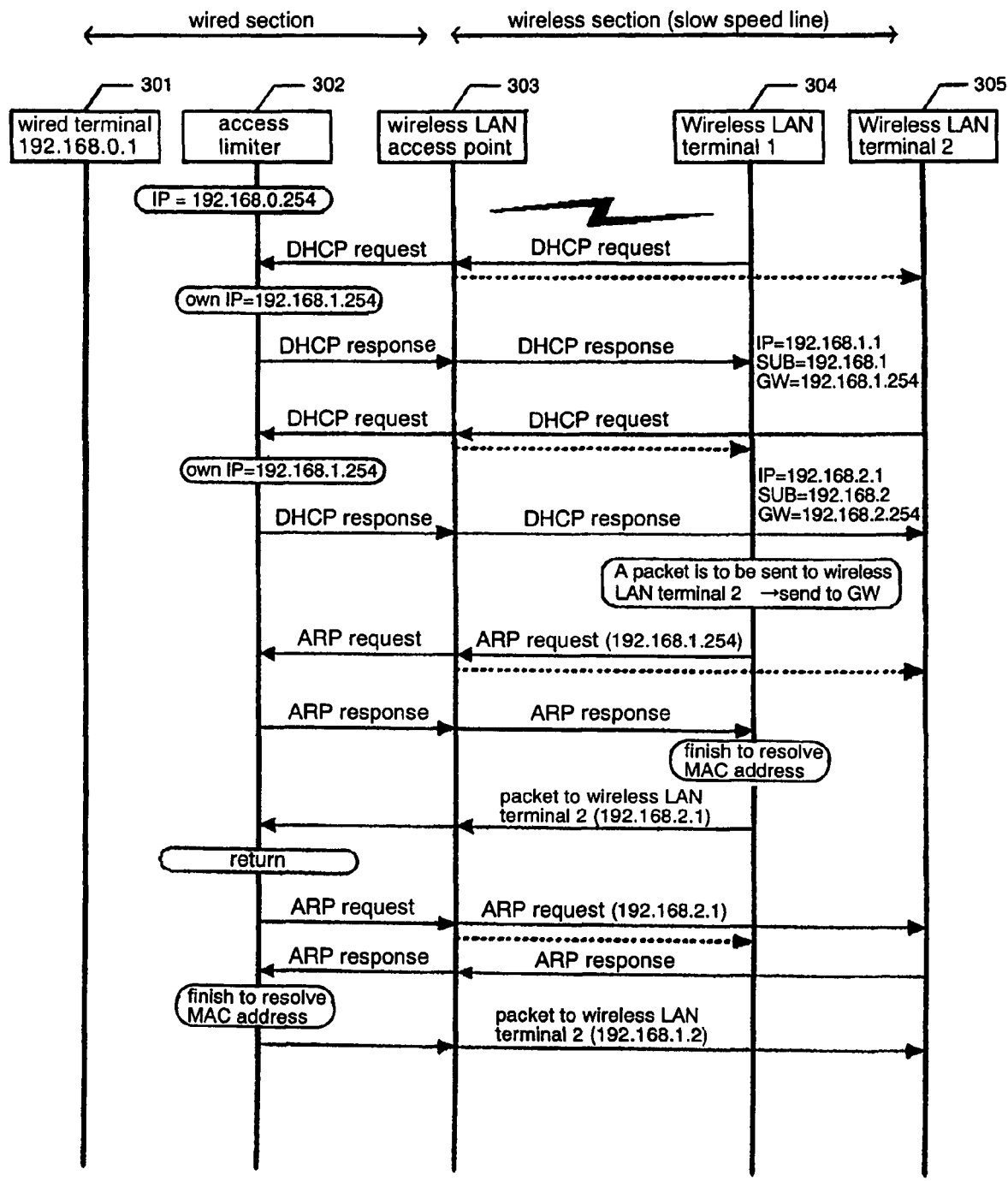
FIG. 4 is a diagram showing a sequence of operation (simple return) of the wireless LAN according to the present invention.

FIG. 4 shows a sequence of operation of the wireless LAN according to the present invention. For illustrative purposes, address information is allocated to terminals as follows:

Wireless LAN terminal 1:

IP address=192.168.1.1

Subnet mask=255.255.255.0

Subnet=192.168.1

Default gateway=192.168.1.254 (=access limiter);

Wireless LAN terminal 2:

IP address=192.168.2.1

Subnet mask=255.255.255.0

Subnet=192.168.2

Default gateway=192.168.2.254 (=access limiter);

Wired terminal:

IP address=192.168.0.1

Subnet mask=255.255.255.0

Subnet=192.168.0

Default gateway=192.168.0.254 (=access limiter).

In this example, the single access limiter has the following three IP addresses:

192.168.0.254, 192.168.1.254, and 192.168.2.254.

The reference numerals 301 through 305 shown in FIG. 4 correspond respectively to the reference numerals 201 through 205 shown in FIG. 3.

When wireless LAN terminal 1 (304) is activated, it sends a DHCP request for automatically resolving its own IP address to wireless LAN address point 303. Since the DHCP request is a broadcast packet, wireless LAN address point 303 transfers the DHCP request to wired access limiter 302 and also broadcasts the DHCP request to the wireless LAN as indicated by the broken-line arrows. Having received the DHCP request, access limiter 302 sets its own address to "192.168.1.254" and sends the following information as a response to wireless LAN terminal 1 (304):

IP address=192.168.1.1

Subnet mask=255.255.255.0

Subnet=192.168.1

Default gateway=192.168.1.254 (=access limiter).

Though wireless LAN terminal 2 (305) receives the DHCP request, it drops the received packet as the DHCP server thereof is not activated.

Similarly, when wireless LAN terminal 2 (305) is activated, access limiter 302 sets its own address to "192.168.2.254" and sends the following information as a response to wireless LAN terminal 2 (305):

IP address=192.168.2.1

Subnet mask=255.255.255.0

Subnet=192.168.2

Default gateway=192.168.2.254 (=access limiter).

It is now assumed that a packet is to be sent from wireless LAN terminal 1 (304) to wireless LAN terminal 2 (305).

Since the subnet "192.168.1" of wireless LAN terminal 1 (304) and the subnet "192.168.2" of wireless LAN terminal 2 (305) are different from each other, wireless LAN terminal 1 (304) sends the packet to the default gateway. Prior to sending the packet, wireless LAN terminal 1 (304) sends an ARP (Address Resolution Protocol) request in order to resolve the MAC (Media Access Control) address of the IP address=192.168.1.254 (=default gateway). Having received the ARP request, wireless LAN access point 303 transfers the ARP request to wired access limiter 302 and wireless LAN terminal 2 (305). In reply to the ARP request, access limiter 203 who has the same address returns a response, and wireless LAN terminal 2 (305) who has a different address drops the packet.

Because wireless LAN terminal 1 (304) has had the MAC address resolved by the ARP request, wireless LAN terminal 1 (304) sends a packet destined for wireless LAN terminal 2 (305) to access limiter 302. Access limiter 302 returns the received packet, and sends it to wireless LAN terminal 2 (305).

In this manner, a packet originating from wireless LAN terminal 1 (304) and destined for wireless LAN terminal 2 (305) can be sent via access limiter 302.

Figure 5:
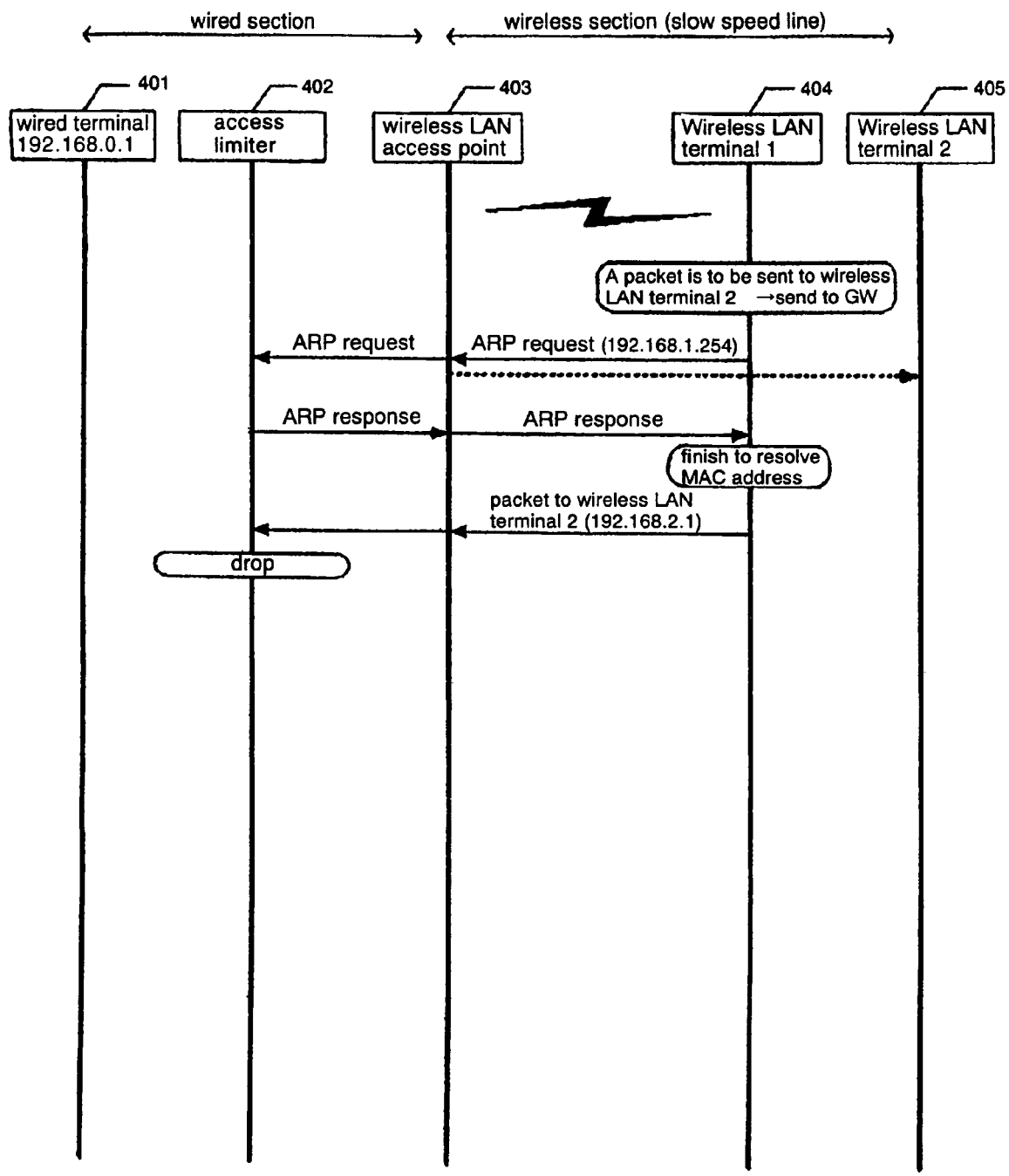
FIG. 5 is a diagram showing a sequence of operation (packet drop) of the wireless LAN according to the present invention.

In FIG. 4, packets are simply returned to achieve the same environment as with the conventional communication environment. FIG. 5 shows a sequence of operation of the wireless LAN according to the present invention with positive access limitation imposed.

In FIG. 5, the sequence of operation serves to inhibit communications between wired LAN terminals. Though a DHCP procedure immediately after the system is activated is omitted from illustration in FIG. 5, the details of such a DHCP procedure are the same as those shown in FIG. 4.

It is assumed that a packet is to be sent from wireless LAN terminal 1 (404) to wireless LAN terminal 2 (405). As with the sequence shown in FIG. 4, a ARP packet is sent, a MAC address is resolved, and a packet is sent to access limiter 402.

Access limiter 402 detects that the designation is wireless LAN terminal 2, and drops the received packet in order to inhibit the packet from being transferred, thus blocking communications between the wireless LAN terminals. If access limiter 402 has a buffering function to buffer the packet rather than dropping the packet, then access limiter 402 can perform priority control over packets depending on their property, e.g., can process audio packets with priority over other packets.

Figure 6:
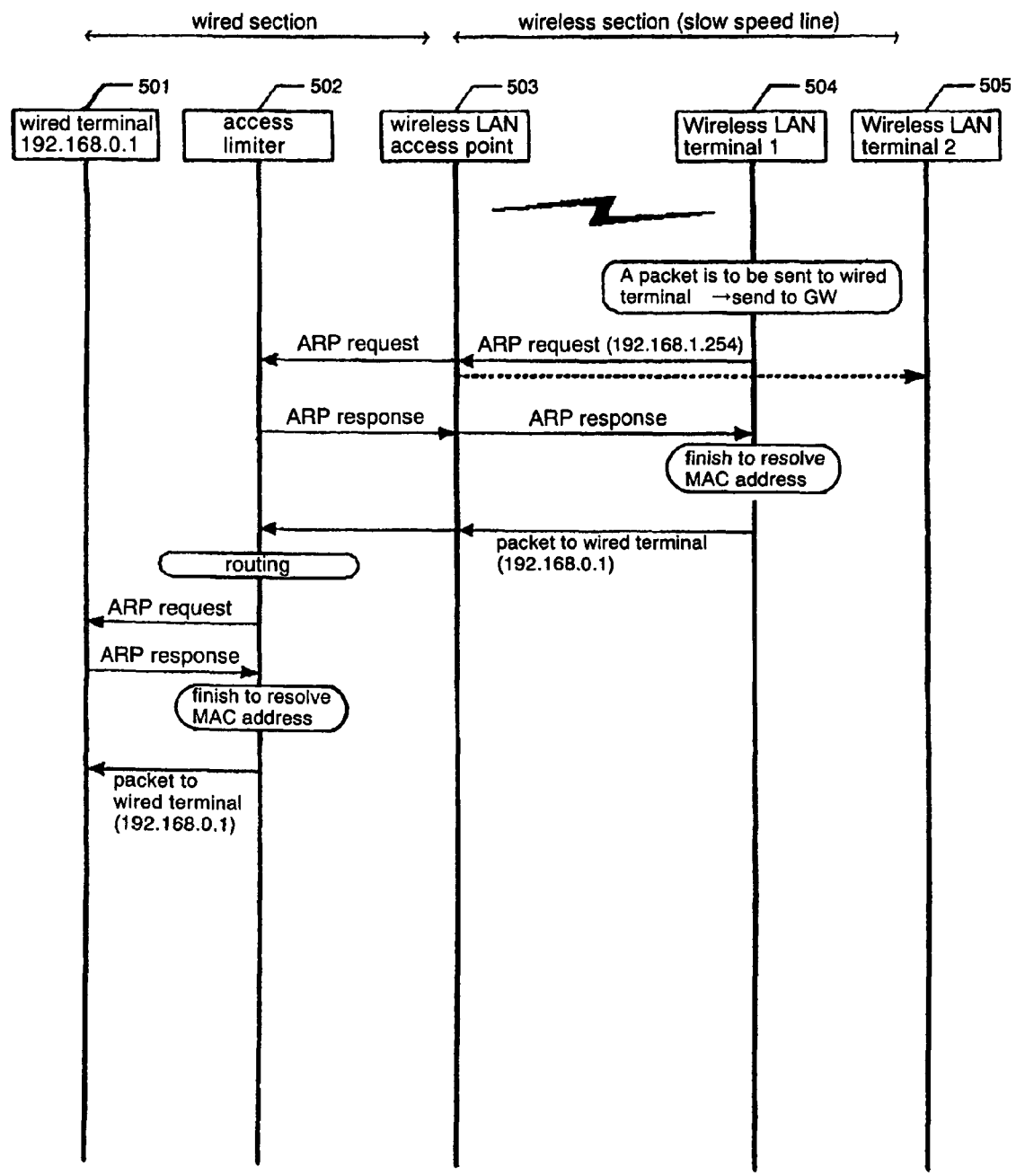
FIG. 6 is a diagram showing a sequence of operation for communications between a wireless LAN terminal and a wireless LAN terminal.

FIG. 6 shows a sequence of operation for packet transmission from a wireless LAN terminal to a wired LAN terminal, though the illustrated sequence of operation has no direct bearing on the present invention. The portion of the sequence in which a MAC address is resolved by an ARP request and a packet is transferred to access limiter 502. In order to send a packet to wired terminal 501, an ARP request it sent to wired terminal 501, and a MAC address is resolved. Thereafter, a packet is sent to wired terminal 501.

Figure 7:
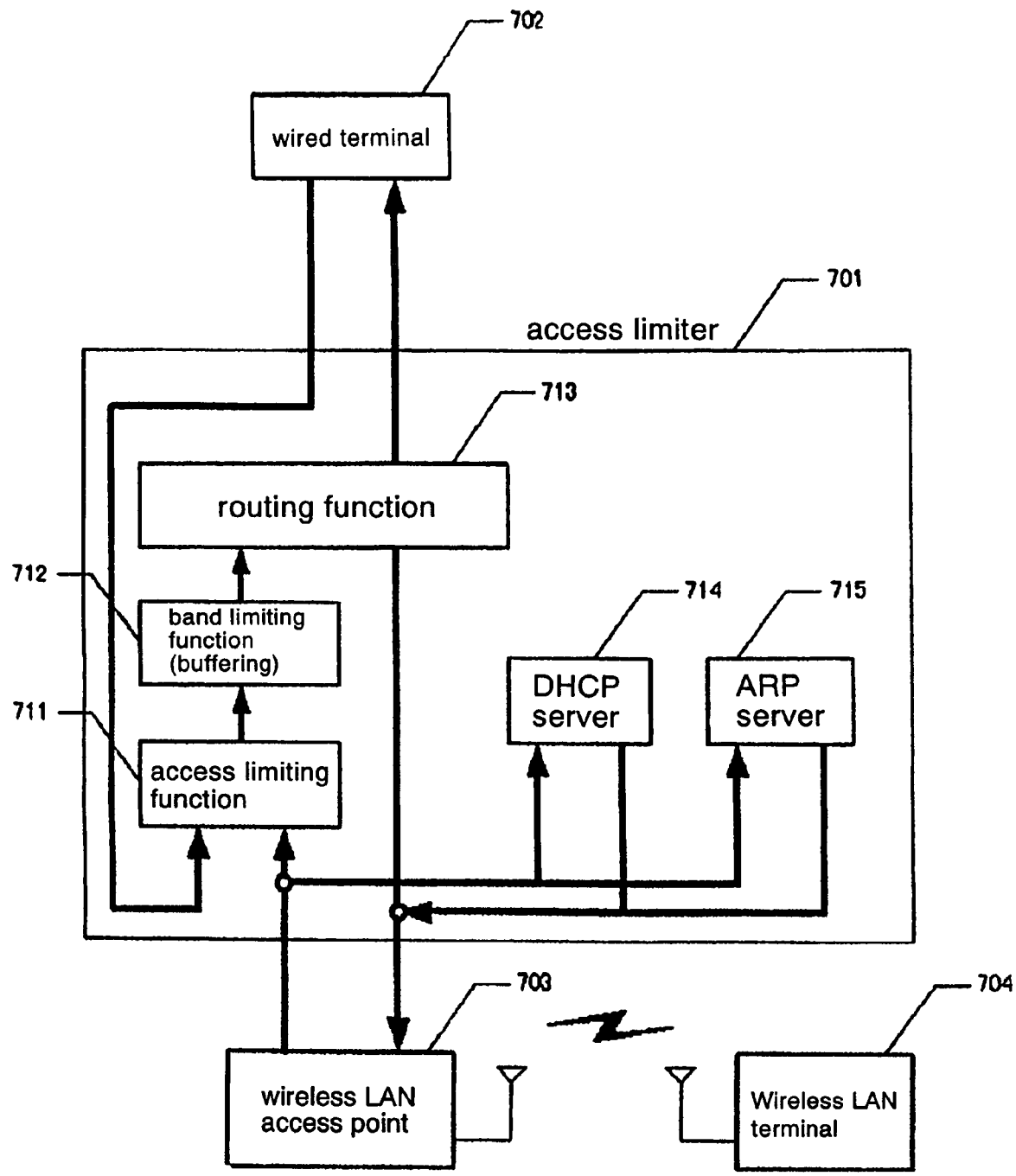
FIG. 7 is a block diagram of the functions of an access limiter according to the present invention.

FIG. 7 shows in block form the functions of the access limiter according to the present invention.

As shown in FIG. 7, access limiter 701 has two LAN interfaces, one connected to wired terminal 702 and one connected to wireless LAN access point 703. Wireless LAN terminal 704 is connected to wireless LAN access point 703.

Access limiter 701 has access limiting function 711 which is one of the functions for operating access limiter 701 effectively. Access limiting function 711 passes or drops a received packet to thereby inhibit or permit communications between the terminals.

Access limiter 701 also has a band limiting function 712 which is also one of the functions for operating access limiter 701 effectively. Band limiting function 712 buffers a received packet to process audio packets with priority over other packets.

Access limiter 701 also has routing function 713 for distributing packets selectively to wired terminal 702 and wireless LAN access point 703 depending on the destination of the packets.

Access limiter 701 further has DHCP server 714. DHCP server 714 itself is of the ordinary nature, but has its settings established according to the present invention. Specifically, DHCP server 714 allocates IP addresses having different subnets for respective terminals in response to DHCP requests from wired LAN terminals.

Access limiter 701 further has ARP server 715 which is normally installed in an existing IP protocol stack.

While a preferred embodiment of the present invention has been described using specific terms, such description is for illustrative purposes only, and it is to be understood that changes and variations may be made without departing from the spirit or scope of the following claims.

What is claimed is:

1. A method of limiting communication access between wireless Local Area Network (LAN) terminals of a wireless LAN, said wireless LAN terminals comprising a first wireless LAN terminal and a second wireless LAN terminal, the first wireless LAN terminal and the second wireless LAN terminal being wirelessly connected, comprising:

allocating different subnetwork addresses to respective wireless LAN terminals in a wireless LAN access point;

setting default gateways of the respective wireless LAN terminals as a single access limiter; and returning a communication packet between the wireless LAN terminals from said access limiter which is set as said default gateways, for providing an access limiting function to limit communication access between the wireless LAN terminals, wherein said access limiter comprises two LAN interfaces connected respectively to a wired terminal and said wireless LAN access point, said wireless LAN terminals being connected to said wireless LAN access point, said access limiter comprising:

an access limiting function for passing or dropping a received packet to thereby inhibit or permit communications between the terminals;

a band limiting function for buffering a received packet to process audio packets with priority over other packets;

a routing function for distributing packets selectively to said wired terminal and said wireless LAN access point depending on a destination of the packets;

a Dynamic Host Configuration Protocol (DHCP) server for allocating IP addresses having different subnets for the respective terminals in response to DHCP requests from said wired LAN terminals; and an Address Resolution Protocol (ARP) server installed in an existing IP protocol stack.

2. The method according to claim 1, wherein, when a first one of the wireless LAN terminals is turned on, said first wireless LAN terminal sends a DHCP request to the wireless LAN access point for automatically resolving its own IP address;

said wireless LAN access point, which operates as a simple bridge between a wireless LAN and a wired LAN, transfers the received DHCP request to the access limiter;

said access limiter, which has a DHCP server function, returns a DHCP response to the DHCP request to said wireless LAN access point, and said wireless LAN access point, which has received the DHCP response, converts the DHCP response from wired data to wireless data, sends the DHCP response to said first wireless LAN terminal to allow said first wireless LAN terminal to make IP communications according to IP address information allocated from the DHCP server, wherein, when a second one of the wireless LAN terminals is turned on, said second wireless LAN terminal sends a DHCP request to the wireless LAN access point for automatically resolving its own IP address;

said wireless LAN access point, which operates as the simple bridge between a wireless LAN and a wired LAN, transfers the received DHCP request to the access limiter;

said access limiter, which has the DHCP server function, returns a DHCP response to the DHCP request to said wireless LAN access point; and said wireless LAN access point, which has received the DHCP response, converts the DHCP response from wired data to wireless data, sends the DHCP response to said second wireless LAN terminal to allow said second wireless LAN terminal to make IP communications according to IP address information allocated from the DHCP server, wherein said first wireless LAN terminal sends a packet destined for said second wireless LAN terminal to said access limiter; and said access limiter transfers the received packet, which is destined for said second wireless LAN terminal, to said second wireless LAN terminal.

3. The method according to claim 2, wherein, when said first wireless LAN terminal is turned on, said first wireless LAN terminal sends a DHCP request to the wireless LAN access point for automatically resolving its own IP address;

since the DHCP request comprises a broadcast packet, said wireless LAN access point transfers the DHCP request to said access limiter on a wired LAN, and broadcasts the DHCP request to said second wireless LAN terminal;

said access limiter, which has received the DHCP request, sets its own IP address to a predetermined value, and sends IP address information as a response to said first wireless LAN terminal; and said second wireless LAN terminal, which has received the DHCP request, drops the received packet as the DHCP server is not activated, wherein, when said second wireless LAN terminal is turned on, said second wireless LAN terminal sends a DHCP request to the wireless LAN access point for automatically resolving its own IP address;

since the DHCP request comprises a broadcast packet, said wireless LAN access point transfers the DHCP request to said access limiter on the wired LAN, and broadcasts the DHCP request to said first wireless LAN terminal;

said access limiter, which has received the DHCP request, sets its own IP address to a predetermined value, and sends IP address information as a response to said second wireless LAN terminal; and said first wireless LAN terminal, which has received the DHCP request, drops the received packet as the DHCP server is not activated, wherein, when a packet is to be sent from said first wireless LAN terminal to said second wireless LAN terminal, since a subnet of said first wireless LAN terminal is different from a subnet of said second wireless LAN terminal, before said first wireless LAN terminal sends the packet to said access limiter set as said default gateways, said first wireless LAN terminal sends an ARP request to resolve a Media Access Control (MAC) address of said default gateways;

said wireless LAN access point, which has received said ARP request, transfers the ARP request to said access limiter on the wired LAN and said second wireless LAN terminal;

said access limiter which has a same address returns a response to said ARP request, and said second wireless LAN terminal which has a different address drops the packet;

since said first wireless LAN terminal has had the MAC address resolved by the ARP request, said first wireless LAN terminal sends a packet destined for said second wireless LAN terminal to said access limiter; and if said access limiter is to permit communications between the wireless LAN terminals, the access limiter returns the received packet and sends the received packet to said second wireless LAN terminal.

4. The method according to claim 2, wherein, when said first wireless LAN terminal is turned on, said first wireless LAN terminal sends a DHCP request to the wireless LAN access point for automatically resolving its own IP address;

since the DHCP request is a broadcast packet, said wireless LAN access point transfers the DHCP request to said access limiter on a wired LAN, and broadcasts the DHCP request to said second wireless LAN terminal;

said access limiter, which has received the DHCP request, sets its own IP address to a predetermined value, and sends IP address information as a response to said first wireless LAN terminal; and said second wireless LAN terminal, which has received the DHCP request, drops the received packet as the DHCP server is not activated, wherein, when said second wireless LAN terminal is turned on, said second wireless LAN terminal sends a DHCP request to the wireless LAN access point for automatically resolving its own IP address;

since the DHCP request is a broadcast packet, said wireless LAN access point transfers the DHCP request to said access limiter on the wired LAN, and broadcasts the DHCP request to said first wireless LAN terminal;

said access limiter, which has received the DHCP request, sets its own IP address to a predetermined value, and sends IP address information as a response to said second wireless LAN terminal; and said first wireless LAN terminal, which has received the DHCP request, drops the received packet as the DHCP server is not activated, and wherein, when a packet is to be sent from said first wireless LAN terminal to said second wireless LAN terminal, since a subnet of said first wireless LAN terminal is different from a subnet of said second wireless LAN terminal, before said first wireless LAN terminal sends the packet to said access limiter set as said default gateways, said first wireless LAN terminal sends an ARP request to resolve a MAC address of said default gateways;

said wireless LAN access point, which has received said ARP request, transfers the ARP request to said access limiter on the wired LAN and said second wireless LAN terminal;

said access limiter which has a same address returns a response to said ARP request, and said second wireless LAN terminal which has a different address drops the packet;

since said first wireless LAN terminal has had the MAC address resolved by the ARP request, said first wireless LAN terminal sends a packet destined for said second wireless LAN terminal to said access limiter; and if said access limiter is to inhibit communications between the wireless LAN terminals, the access limiter drops the received packet.

5. The method according to claim 2, wherein, when said first wireless LAN terminal is turned on, said first wireless LAN terminal sends a DHCP request to the wireless LAN access point for automatically resolving its own IP address;

since the DHCP request comprises a broadcast packet, said wireless LAN access point transfers the DHCP request to said access limiter on a wired LAN, and broadcasts the DHCP request to said second wireless LAN terminal;

said access limiter, which has received the DHCP request, sets its own IP address to a predetermined value, and sends IP address information as a response to said first wireless LAN terminal; and said second wireless LAN terminal, which has received the DHCP request, drops the received packet as the DHCP server is not activated, wherein, when said second wireless LAN terminal is turned on, said second wireless LAN terminal sends a DHCP request to the wireless LAN access point for automatically resolving its own IP address;

since the DHCP request comprises a broadcast packet, said wireless LAN access point transfers the DHCP request to said access limiter on the wired LAN, and broadcasts the DHCP request to said first wireless LAN terminal;

said access limiter, which has received the DHCP request, sets its own IP address to a predetermined value, and sends IP address information as a response to said second wireless LAN terminal; and said first wireless LAN terminal, which has received the DHCP request, drops the received packet as the DHCP server is not activated, and wherein, when a packet is to be sent from said first wireless LAN terminal to said second wireless LAN terminal, since a subnet of said first wireless LAN terminal is different from a subnet of said second wireless LAN terminal, before said first wireless LAN terminal sends the packet to said access limiter set as said default gateways, said first wireless LAN terminal sends an ARP request to resolve a MAC address of said default gateways;

said wireless LAN access point, which has received said ARP request, transfers the ARP request to said access limiter on the wired LAN and said second wireless LAN terminal;

said access limiter which has a same address returns a response to said ARP request, and said second wireless LAN terminal which has a different address drops the packet;

since said first wireless LAN terminal has had the MAC address resolved by the ARP request, said first wireless LAN terminal sends a packet destined for said second wireless LAN terminal to said access limiter; and if said access limiter is to buffer communications between the wireless LAN terminals, the access limiter performs priority control of the received packet depending on a property thereof.

6. The method according to claim 1, wherein providing the access limiting function to limit communication access between the wireless LAN terminals is done without modifying the existing wireless LAN access point.

7. A wireless LAN system, comprising:

a wireless LAN access point configured to wirelessly associate with a plurality of wireless terminals, said plurality of wireless terminals being wirelessly connected;

an access limiter configured to control communications between a first of the plurality of the wireless terminals and a second of the plurality of the wireless terminals at the wireless LAN access point;

a band limiter to buffer a received packet to process audio packets with priority over other packets;

a router to distribute packets selectively to said wired terminal and said wireless LAN access point depending on a destination of the packets;

a Dynamic Host Configuration Protocol (DHCP) server for allocating IP addresses having different subnets for the respective terminals in response to DHCP requests from said wired LAN terminals; and an Address Resolution Protocol (ARP) server installed in an existing IP protocol stack, wherein the first wireless terminal and the second wireless terminal communicate through the access limiter, and wherein each of the first wireless terminal and the second wireless terminal are allocated different subnetwork addresses.

8. The wireless LAN system of claim 7, wherein the access limiter is configured as a default gateway for the plurality of wireless terminals.

9. The wireless LAN system of claim 8, further comprising a wired terminal configured to associate with the access limiter.

10. The wireless LAN system of claim 9, wherein the wireless access point receives an address resolution protocol request from the first wireless terminal and transmits the address resolution protocol request to the access limiter and to the second wireless terminal, and wherein the access limiter returns the request and the second wireless terminal drops the request.

11. The wireless LAN system of claim 7, wherein, when the first wireless terminal transmits a packet intended for the second wireless terminal to the access limiter, the access limiter detects that the packet is intended for the second wireless terminal and drops the packet.

12. The wireless LAN system of claim 7, wherein, when the first wireless terminal transmits a packet intended for the second wireless terminal to the access limiter, the access limiter performs priority control over the packet among a plurality of received packets.

13. The wireless LAN system of claim 7, wherein the access limiter is configured to instruct each of the plurality of wireless terminals, upon activation, to set the access limiter as a respective default gateway for that wireless terminal.

14. A wireless network router, comprising:

a wireless access point; and an access limiter comprising a plurality of Local Address Network (LAN) interfaces associated to the wireless access point, the access limiter comprising:

an access limiting apparatus to pass or drop a received packet to thereby inhibit or permit communications between a plurality of wireless terminals, said plurality of wireless terminals being wirelessly connected;

a routing apparatus for distributing packets selectively between the wireless LAN access point depending on a destination of the packets between the plurality of wireless terminals;

a band limiter to buffer a received packet to process audio packets with priority over other packets;

a router to distribute packets selectively to said wired terminal and said wireless LAN access point depending on a destination of the packets;

a Dynamic Host Configuration Protocol (DHCP) server for allocating IP addresses having different subnets for the respective terminals in response to DHCP requests from said wired LAN terminals; and an Address Resolution Protocol (ARP) server installed in an existing IP protocol stack, wherein communication between any of the plurality of wireless terminals is routed through the access limiter, and wherein each of the wireless terminals is allocated a different subnetwork address.

15. The wireless network router of claim 14, wherein, when a first one of the plurality of wireless terminals is turned on, the first wireless terminal sends a first Dynamic Host Configuration Protocol (DHCP) request to the access point to automatically resolve an IP address thereof, wherein the access point transfers the received DHCP request to the access limiter and returns a first DHCP response to the first wireless terminal, wherein, when a second one of the plurality of wireless terminals is turned on, the second wireless terminal sends a second DHCP request to the wireless LAN access point, wherein the access point transfers the received second DHCP request to the access limiter and returns a second DHCP response to the second wireless terminal, wherein, when the first wireless terminal transmits a packet destined for the second wireless terminal to the access limiter, the access limiter transfers the received packet, which is destined for the second wireless terminal, to the second wireless terminal.

16. The wireless network router of claim 14, further comprising a DHCP server for allocating IP addresses having different subnets for the respective wireless terminals in response to DHCP requests from wired LAN terminals.

* * * * *